US010621435B2

(12) United States Patent
Bridges et al.

(10) Patent No.: US 10,621,435 B2
(45) Date of Patent: Apr. 14, 2020

(54) EFFICIENT IMAGE ANALYSIS

(71) Applicant: Google LLC, Mountain View, CA (US)

(72) Inventors: Matthew J. Bridges, New Providence, NJ (US); Alessandro Fin, Los Gatos, CA (US); Hartwig Adam, Los Angeles, CA (US); Jeffrey M. Gilbert, Los Alto, CA (US)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 15/754,909

(22) PCT Filed: Feb. 9, 2018

(86) PCT No.: PCT/US2018/017634
§ 371 (c)(1),
(2) Date: Feb. 23, 2018

(87) PCT Pub. No.: WO2018/212809
PCT Pub. Date: Nov. 22, 2018

(65) Prior Publication Data
US 2018/0373934 A1    Dec. 27, 2018

Related U.S. Application Data

(60) Provisional application No. 62/508,873, filed on May 19, 2017.

(51) Int. Cl.
*G06K 9/00* (2006.01)
*H04N 5/232* (2006.01)
(Continued)

(52) U.S. Cl.
CPC ..... *G06K 9/00671* (2013.01); *G06K 9/00456* (2013.01); *G06K 9/036* (2013.01);
(Continued)

(58) Field of Classification Search
CPC .............. H04N 5/23216; H04N 5/765; H04N 5/23258; H04N 5/44504; G06K 9/00671;
(Continued)

(56) References Cited

U.S. PATENT DOCUMENTS 8,965,117 B1   2/2015   Rybakov et al.
9,024,972 B1   5/2015   Bronder et al.
(Continued)

OTHER PUBLICATIONS

PCT International Search Report and Written Opinion issued in International Application No. PCT/US2018/017634, dated Jul. 12, 2018, 17 pages.
(Continued)

*Primary Examiner* — Lin Ye
*Assistant Examiner* — John H Morehead, III
(74) *Attorney, Agent, or Firm* — Dority & Manning P.A.

(57) ABSTRACT

Methods, systems, and apparatus for efficient image analysis. In some aspects, a system includes a camera configured to capture images, one or more environment sensors configured to detect movement of the camera, a data processing apparatus, and a memory storage apparatus in data communication with the data processing apparatus. The data processing apparatus can access, for each of a multitude of images captured by a mobile device camera, data indicative of movement of the camera at a time at which the camera captured the image. The data processing apparatus can also select, from the images, a particular image for analysis based on the data indicative of the movement of the camera for each image, analyze the particular image to recognize one or more objects depicted in the particular image, and present content related to the one or more recognized objects.

23 Claims, 4 Drawing Sheets

(51) Int. Cl.
*H04N 5/445* (2011.01)
*H04N 5/765* (2006.01)
*G06K 9/03* (2006.01)
*G06K 9/62* (2006.01)
*G06K 9/20* (2006.01)
*G06F 3/0484* (2013.01)

(52) U.S. Cl.
CPC .............. *G06K 9/20* (2013.01); *G06K 9/6227* (2013.01); *G06K 9/6267* (2013.01); *H04N 5/23216* (2013.01); *H04N 5/23258* (2013.01); *H04N 5/44504* (2013.01); *H04N 5/765* (2013.01); *G06F 3/04842* (2013.01); *G06K 2209/27* (2013.01)

(58) Field of Classification Search
CPC .... G06K 9/20; G06K 9/6267; G06K 9/00456; G06K 9/036; G06K 9/6227; G06K 2209/27; G06F 3/04842
See application file for complete search history.

(56) References Cited

U.S. PATENT DOCUMENTS

| | | | |
|---|---|---|---|
| 9,626,577 B1 | 4/2017 | Yu et al. | |
| 9,750,420 B1* | 9/2017 | Agrawal | A61B 5/02427 |
| 9,852,135 B1* | 12/2017 | McHugh | G06F 16/40 |
| 2014/0212002 A1* | 7/2014 | Curcio | G06K 9/00744 |
| | | | 382/107 |
| 2015/0172539 A1* | 6/2015 | Neglur | H04N 5/23206 |
| | | | 348/207.1 |
| 2015/0346585 A1* | 12/2015 | Sakurabu | H04N 5/23212 |
| | | | 348/224.1 |
| 2016/0292881 A1* | 10/2016 | Bose | G06K 9/00342 |
| 2016/0358628 A1* | 12/2016 | Liu | G11B 27/031 |
| 2017/0019130 A1* | 1/2017 | Henry | H04B 1/16 |
| 2017/0148488 A1* | 5/2017 | Li | G11B 27/034 |

OTHER PUBLICATIONS

Invitation to Pay Additional Fees and Where Applicable Protest Fee, issued in International Application No. PCT/US2018/017634, dated Apr. 26, 2018, 11 pages.

* cited by examiner

EFFICIENT IMAGE ANALYSIS

BACKGROUND

Computer vision techniques enable computers to analyze and extract information from images. For example, optical character recognition (OCR) techniques can be used to detect and extract text from images. Similarly, edge detection techniques can be used to detect objects depicted in images.

SUMMARY

This specification describes technologies relating to efficient image analysis that enables electronic devices to recognize objects in images and/or extract information from images, and present information or other content related to the images while reducing the consumption of computational and electrical power of the electronic devices.

In general, one innovative aspect of the subject matter described in this specification can be embodied in devices that include image sensor configured to output image pixel data, an image buffer configured to temporarily store the image pixel data, an environment sensor, and an image processing apparatus. The device can also include a controller configured to determine an expected image quality of the image pixel data based on a signal output by the environment sensor and provide the image pixel data to the image processing apparatus selectively, according to the expected image quality. Other implementations of this aspect include corresponding apparatus, methods, systems, and computer programs, configured to perform the actions of the methods, encoded on computer storage devices.

These and other implementations can each optionally include one or more of the following features. In some aspects, if the controller determines the expected image quality of the image pixel data to be below a preset minimum quality threshold, the image pixel data are not provided to the image processing apparatus. If the controller determines the expected image quality of the image pixel data to be equal to or above a preset minimum quality threshold, the image pixel data are provided to the image processing apparatus.

Some aspects include a selected frame buffer. The controller can be configured to copy the image pixel data from the image buffer to the selected frame buffer or update a selected frame pointer to the image buffer, according to the expected image quality of the image pixel data and to provide the image processing apparatus with the image pixel data stored in the selected frame buffer.

In some aspects, the controller is configured to compare the expected image quality of the image pixel data in the image buffer to the expected image quality of the image pixel data of the selected frame buffer, and copy the image pixel data from the image buffer to the selected frame buffer or update a selected frame pointer to the image buffer if the expected image quality of the image pixel data in the image buffer equals or exceeds the expected image quality of the selected frame buffer.

In some aspects, the environment sensor includes an inertial sensor, and the controller is configured to determine the expected image quality based on a sensed movement of the apparatus. In some aspects, the controller is configured to determine the expected image quality based on the signal output by the environment sensor and a signal output by the image sensor. In some aspects, the signal output by the image sensor includes at least one of brightness information, focus information or histogram data relating to the image pixel data output by the image sensor.

In general, another aspect of the subject matter described in this specification can be embodied in methods that include generating image pixel data, storing the image pixel data temporarily in an image buffer, determining an expected image quality of the image pixel data based on an environmental signal, and image processing the image pixel data selectively, according to the expected image quality. Other implementations of this aspect include corresponding apparatus, systems, and computer programs, configured to perform the actions of the methods, encoded on computer storage devices.

These and other implementations can each optionally include one or more of the following features. In some aspects, if the expected image quality of the image pixel data is determined to be below a preset minimum quality threshold, the image pixel data are not provided for image processing.

Some aspects include copying the image pixel data from the image buffer to a selected frame buffer or updating a pointer to the image buffer, according to the expected image quality of the image pixel data. The image pixel data stored in the selected frame buffer can be provided for image processing.

In some aspects, the environmental signal includes an inertial signal, and expected image quality is determined based on a sensed movement. The expected image quality can be determined based on the environmental signal and an image information signal generated with the image pixel data. The image information signal can include at least one of brightness information, focus information or histogram data relating to the generated image pixel data.

In general, another aspect of the subject matter described in this specification can be embodied in image processing apparatus that include one or more image recognition modules corresponding to respective object classes. Each image recognition module can be configured to identify one or more objects in the respective object class. The image processing apparatus can also include a coarse recognition module configured to receive an input image, determine whether the input image includes an image feature which identifies one of the object classes, and provide the input image for processing by the image recognition module which corresponds to the identified object class. Other implementations of this aspect include corresponding systems, methods, and computer programs, configured to perform the actions of the methods, encoded on computer storage devices.

These and other implementations can each optionally include one or more of the following features. In some aspects, the coarse recognition module is configured to provide the image recognition module with information indicating a position and/or orientation of the object. In some aspects, the image recognition modules correspond to one or more of a text object class, a landmark object class, a barcode object class, a media object class and an artwork object class.

In some aspects, the one or more image recognition modules are configured to output an identified object in the respective object class with an associated confidence score. The one or more image recognition modules can be configured to adjust an output confidence score for an identified object based on a previous output of the image recognition module.

In some aspects, the output confidence score can be adjusted based on at least one of an edit distance between the identified object or text within the identified object, and a previously identified object, a location of the previously identified object and the confidence score associated with the previously identified object. Some aspects include a communication unit. The coarse recognition module can be arranged remotely from the one or more image recognition modules.

In some aspects, the coarse recognition module is configured to provide a reduced version of the input image for processing by the image recognition module. The reduced version of the input image can be one of a low resolution version, a cropped version, or a vector representation of the input image.

In general, another aspect of the subject matter described in this specification can be embodied in image processing methods that include receiving an input image, determining whether the input image includes an image feature which identifies one of one or more object classes, and image processing the input image to identify one or more objects in the identified object class. Other implementations of this aspect include corresponding systems, apparatus, and computer programs, configured to perform the actions of the methods, encoded on computer storage devices.

These and other implementations can each optionally include one or more of the following features. Some aspects include determining information indicating a position and/or orientation of the object. Image processing the input image to identify one or more objects can be based on the determined information indicating the position and/or orientation of the object. The object classes can include one or more of a text object class, a landmark object class, a barcode object class, a media object class and an artwork object class.

Some aspects include outputting an identified object with an associated confidence score and adjusting an output confidence score for an identified object based on a previous output. In some aspects, the output confidence score is adjusted based on at least one of an edit distance between the identified object and a previously identified object, a location of the previously identified object and the confidence score associated with the previously identified object.

Some aspects include generating a reduced version of the input image for image processing to identify one or more objects. The reduced version of the input image can be one of a low resolution version, a cropped version, or a vector representation of the input image.

In general, another aspect of the subject matter described in this specification can be embodied in image processing system that include a camera configured to capture images, one or more environment sensors configured to detect movement of the camera, a data processing apparatus, and a memory storage apparatus in data communication with the data processing apparatus. The memory storage apparatus can store instructions executable by the data processing apparatus and that upon such execution cause the data processing apparatus to perform operations including accessing, for each of a multitude of images captured by a mobile device camera, data indicative of movement of the camera at a time at which the camera captured the image. The data processing apparatus can select, from the images, a particular image for analysis based on the data indicative of the movement of the camera for each image. The data processing apparatus can analyze the particular image to recognize one or more objects depicted in the particular image and present content related to the one or more recognized objects. Other implementations of this aspect include corresponding methods, apparatus, and computer programs, configured to perform the actions of the methods, encoded on computer storage devices.

These and other implementations can each optionally include one or more of the following features. In some aspects, the operations can include analyzing the particular image using a coarse classifier to detect presence of one or more classes of objects depicted in the particular image. The particular image can be analyzed to recognize one or more objects depicted in the particular image in response to detecting the presence of the one or more classes of objects in the particular image.

In some aspects, analyzing the image to recognize one or more objects depicted by the image includes analyzing the image using one or more computer vision techniques. The data indicative of the movement of the mobile device can include at least one of (i) inertial acceleration measurements received from an accelerometer sensor of the mobile device or (ii) orientation data received from a gyroscope of the mobile device.

In some aspects, selecting a particular image for analysis can include selecting the particular image based on the particular image having a least amount of movement at the time the camera captured the particular image relative to each an amount of movement at the time the camera captures each other image in the multitude of images. The data indicative of the movement of the mobile device for each image can include data describing rotational motion of the mobile device at the time at which the image was captured. In some aspects, selecting a particular image for analysis can include selecting the particular based on the rotational motion of the mobile device at the time at which the particular image was captured being less than a threshold amount of rotational motion.

In some aspects, the operations can include receiving a request for an image to be analyzed by the coarse classifier following completion of analysis of a previous image by the coarse classifier. Selecting a particular image for analysis can include selecting the particular image based on the particular image having a least amount of movement relative to other images in a set of images captured by the camera following the previous image being sent to the coarse classifier for analysis.

In some aspects, analyzing the particular image using the coarse classifier can include initiating analysis by the coarse classifier periodically based on a processing rate. The operations can include adjusting the processing rate based on user interactions with the camera application. The operations can include adjusting the processing rate based on whether presence of one or more classes of objects has been detected in one or more images analyzed by the coarse classifier over a previous time period. The processing rate can be increased such that more images are analyzed by the coarse classifier per unit time in response to detecting presence of one or more classes of objects in at least one image over the previous time period. The processing rate can be reduced such that fewer images are analyzed by the coarse classifier per unit time in response to not detecting presence of one or more classes of objects in at least one image over the previous time period.

In some aspects, presenting content related to the one or more identified objects can include presenting a results page that include results that include links to resources related to the one or more identified objects. Presenting content related to the one or more identified objects can include presenting, for each identified object, content related to the object in an overlay over the object. Presenting content related to the one or more identified objects can include presenting a selectable user interface element that, when selected by a user, initiates a particular action associated with the one or more identified objects. Presenting content related to the one or more identified objects can include selecting, for each class for which presence of an object of the class was detected by the coarse classifier, a content item related to the class and presenting a content item for each class for which presence of an object of the class was detected by the coarse classifier.

In some aspects, selecting a particular image for analysis based on the data indicative of the movement the movement of the mobile device camera can include selecting the particular image independent of data indicative of visual characteristics of the images. Selecting a particular image for analysis based on the data indicative of the movement of the mobile device camera can include selecting the particular image based on the data indicative of the movement of the mobile device camera for each image in combination with data indicative of visual characteristics of each image. The data indicative of the visual characteristics of each images can include at least one of (i) brightness data, (ii) focus data, or (iii) histogram data.

In some aspects, selecting a particular image for analysis can include determining, for each image, an expected image quality of the image based on the data indicative of the movement of the mobile device camera for the image and selecting, as the particular image, an image having a highest expected image quality. Selecting a particular image for analysis can include determining, for a first image, a first expected image quality of the first image based on the data indicative of the movement of the mobile device camera for the first image. Image data for the first image can be stored in a selected frame buffer based on the first expected image quality of the first image. A second expected image quality of a second image can be determined based on the data indicative of the movement of the mobile device camera for the second image. A determination can be made to replace, in the selected frame buffer, the image data for the first image with the image data for the second image based on the second expected image quality being greater than the first expected image quality.

Some aspects can include analyzing a second image using a coarse classifier to detect presence of one or more classes of objects depicted in the particular image and determining to not analyze the second image to recognize one or more objects depicted in the particular image in response to failure to detect the presence of the one or more classes of objects in the particular image using the coarse classifier.

The subject matter described in this specification can be implemented in particular embodiments so as to realize one or more of the following advantages. By selecting images for analysis based on data indicative of the movement of a camera capturing the images, higher quality images can be selected for more detailed analysis quickly and using fewer computing resources and less electrical power than selecting the images based on an analysis of visual characteristics of each image. Storing only a single best image (or fewer than a threshold number of images) of a stream of images for subsequent analysis reduces the amount of consumed memory, freeing up memory space for other applications. These features also ensure that a higher quality image is used in the computer vision analysis, resulting in more accurate vision analysis results and more relevant content being provided based on objects recognized in the image.

Using coarse classifiers to identify the presence of particular classes of objects and only performing further computer vision analysis on images that are classified as depicting an object of one of the classes reduces the number of images analyzed using computer vision analysis techniques. Additionally, a multi-class coarse classifier can limit additional processing to the fine classifier(s) matching the type(s) detected by the coarse classifier. As later-stage computer vision analysis can be more computationally intensive than the coarse classification and the image selection, this greatly reduces the demand placed on computing resources and conserves computational and electrical power for use by other applications. This also can improve the speed at which images are analyzed as it reduces the number of images placed into a queue for analysis. The image selection and analysis techniques described herein also allow for modeless integration of visual analysis into existing applications without compromising the applications' primary behavior (e.g., taking pictures with a camera).

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
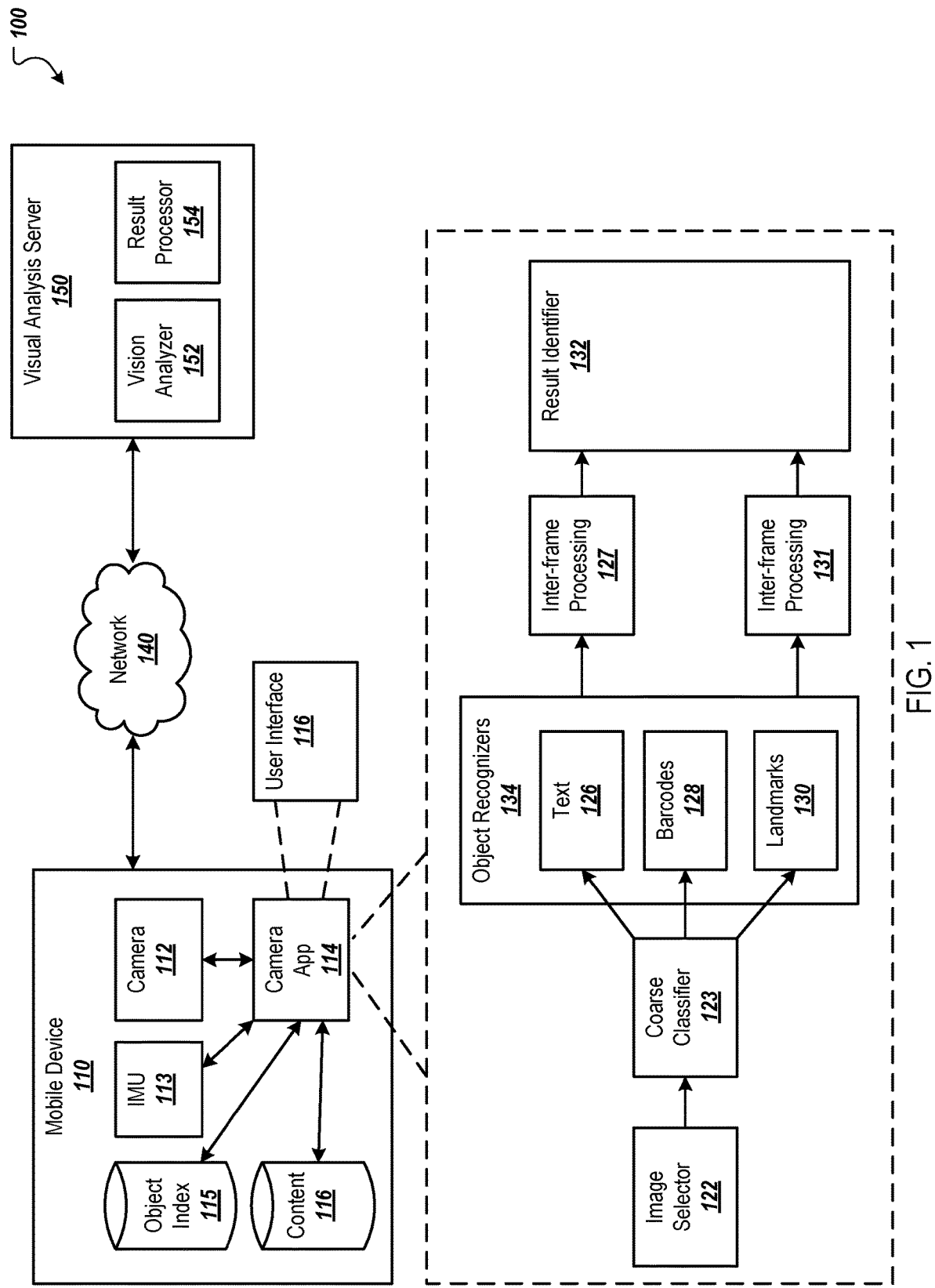
FIG. 1 is a block diagram of an environment in which an example mobile device analyzes images and presents content related to one or more objects depicted in the images.

In general, systems and techniques described herein can reduce the consumption of computing resources and electrical power used to analyze images, while also improving the accuracy of the image analysis, by selectively analyzing images that are expected to be high quality. For example, images may be analyzed to recognize objects depicted in the images and to extract information about objects depicted in the images for the purpose of providing additional information about the objects. A user of a mobile device, e.g., a smart phone or tablet computing device, may capture images of objects using a camera of the mobile device. One or more of the images can be selected for analysis, e.g., based on an expected quality of the images determined based on data indicative of the movement of the camera at the time the images were captured. The selected images can be analyzed to provide additional content for presentation at the mobile device. For example, the content may be displayed with the image in a user interface of the mobile device or results from the analysis may be stored for later use.

Mobile devices typically have less computing power and data storage capacity than desktop computers and servers. Mobile devices also typically have limited battery power and thermal dissipation capabilities. Thus, techniques for performing image analysis in a way that reduces the utilization of computing resources and battery power can improve the functioning and the performance of the mobile devices by preserving the limited computing power and electrical power for other applications and/or processes, and reducing the amount of heat generated by the mobile devices.

In some implementations, image analysis is performed on images of a sequence of images such as a video stream. For example, a user may activate a camera mode that provides content related to objects depicted in images and point the camera at various objects. In another example, a camera application may generally have this feature active when the camera application is active. In these examples, some (e.g., less than all) of the images in the sequence of images may be analyzed to recognize object(s) depicted in the images. The techniques described herein can use one or more low power consuming stages to select images for further analysis to reduce the number of images analyzed and to reduce the amount of computing power and electrical power consumed by the analysis process.

In some implementations, a low power consuming stage can determine an expected image quality of an image. For example, an expected image quality can be determined based on an environment sensor of the device. The determination of an expected image quality may require fewer processing resources than the further analysis to recognize object(s) depicted, and thus less power is consumed. In this way, unnecessary consumption of resources to analyze images having a low image quality may be avoided.

In some implementations, a low power consuming stage can determine whether an image includes an image feature which identifies an object class. An image including such an image feature can be provided for further analysis by an image recognition module which corresponds to the identified class. The determination of such an image feature may require fewer processing resources than the further analysis to recognize the object(s) depicted, and thus less power is consumed. In this way, unnecessary consumption of resources to analyze images which do not include any object(s) may be avoided. Furthermore, by providing an image for further analysis by an image recognition module which corresponds to the identified class, the image recognition modules can be made more efficient, and further reductions in the processing requirements of the system can be provided.

FIG. 1 is a block diagram of an environment 100 in which an example mobile device 110 analyzes images and presents content related to one or more objects depicted in the images. The mobile device 110 may be a smart phone, tablet computer, laptop computer, wearable device, or other appropriate type of mobile device. Although a mobile device 110 is illustrated in FIG. 1 and described herein, the components of the mobile device 110 may be included in other types of electronic devices (e.g., desktop computers) and the techniques performed by the mobile device 110 may be performed by other electronic devices.

The mobile device 110 includes a camera 112 and a camera application 114. The camera 112 capture still images (e.g., digital photos) and videos. The camera application 114 may be a native application developed for use on a particular platform or a particular device. The camera application 114 enables a user to control the camera 112 and to view images and video captured by the camera 112. The camera 112 can include an image sensor that is configured to output image data (e.g., image pixel data) captured by the image sensor. The pixel data for each pixel of the image can specify one or more visual characteristics of the pixel, e.g., the color of the pixel.

The camera application 114 can also perform image selection techniques and/or image analysis techniques on captured images to provide content related to objects recognized in the images. In some implementations, the camera application 114 captures an image and analyzes the image in response to a user selecting an icon. For example, the user can point the camera 112 at an object and select the icon to capture an image of the object and receive content related to the object.

In some implementations, the camera application 114 performs the image analysis process automatically, e.g., in an always-on state, on a stream of images being captured by the camera 112. For example, the camera application 114 can select images from a video stream and analyze the selected images to recognize objects depicted in the images and provide content related to the recognized objects. In a particular example, the camera application 114 can select the images from a sequence of images captured by the camera 112 while the user is pointing the camera 112 at an object. In another example, the camera application 114 can use the camera 112 to capture images of a scene that is visible in a viewfinder of the camera 112 (or the mobile device 110).

Although the following description is in terms of the camera application 114 performing the image selection and image analysis techniques on the images, the techniques (or a portion thereof) can be performed by another application, (e.g., a camera-first application that can access and/or control the camera to present content related to images captured by the camera), hardware circuitry of the mobile device, a controller, or another appropriate hardware and/or software component.

The camera application 114 can use one or more low power consuming stages to select images that are analyzed for object recognition. The one or more stages can ensure that the images that are analyzed in later stages are of sufficient quality and depict one or more objects that may be of interest to a user. This allows the mobile device 110 to not waste computational resources and battery power on images for which objects may not be recognized or for which content may not be identified.

The camera application 114 includes an image selector 122 that selects an image from an image stream for further processing based on data indicative of the movement of the camera 112 ("movement data") at the time at which the image was captured. The movement data at the time at which the image was captured can include movement data for the camera 112 for a time window that begins a specified period of time before the image was captured to a specified period of time after the image was captured. For example, if the camera 112 is moving while capturing an image, the image is more likely to be low quality (e.g., blurry) than if the camera 112 is still. By using movement data for an image instead of visual characteristics of the images, the selection can be performed more quickly and by using fewer computing resources. For example, the camera application 114 can select an image from multiple images without detecting and evaluating any visual characteristics of the images and just using movement data for the images. As described below, the camera application 114 can also use visual characteristics of images in combination with the movement data for the images to select an image for further processing.

The camera application 114 can obtain or receive the movement data for an image from an inertial measurement unit (IMU) 113 of the mobile device 110 or another type of environment sensor. For example, the camera application 114 can obtain the movement data for an image when the camera application 114 causes the camera 112 to capture the image. An IMU is an electronic device that may include one or more accelerometers, one or more gyroscopes, and/or one or more magnetometers. The IMU data can be in the form of a game rotation vector. In some implementations, the mobile device 110 may include separate accelerometers, gyroscopes, and/or magnetometers. The movement data for an image can include inertial acceleration measurements received from the IMU 113, and/or orientation data received from the IMU 113 or a separate gyroscope.

In some implementations, the movement data for an image only includes orientation data received from a gyroscope. For example, the orientation data from the gyroscope can be used to determine orientation changes that occurred at the time at which the image was captured.

The camera application 114 can use the movement data for an image (e.g., the data received from the IMU 113) to determine a quality score for the image. The quality score for an image can represent an expected image quality of the image. The quality score for an image can be based on (e.g., inversely proportional to) a measure of rotational motion of the camera 112 at the time the image was captured, which can be determined using the movement data. The quality score for an image can be based on orientation changes of the camera 112 at the time at which the image was captured. For example, orientation data that specifies the orientation of the mobile device 110 before, during, and after the image was captured can be used to determine whether the orientation of the camera 112 was changing at the time the image was captured.

The camera application 114 can select, from multiple images, one or more images for further analysis based on the quality scores for the images. For example, the camera application 114 may select the image having the highest quality score (e.g., the least amount of rotational motion or least amount of movement) for further analysis. The camera application 114 can also use the recency of the images to determine which to use for further processing. The camera application 114 can then send image data for the selected image for further processing, e.g., by a coarse classifier 123 described below. The camera application 114 can then capture additional images and select, from the additional images, another image for further analysis. In this example, the coarse classifier 123 can request another image or notify the camera application 114 that it is ready for another image. In response, the camera application 114 can send the selected image to the coarse classifier 123.

The camera application 114 can continuously analyze images and store the best image while waiting for the coarse classifier 123 to finish processing a previous image or otherwise become ready to analyze another image. For example, the camera application 114 may store image data for a highest quality image that has an associated highest quality score among a set of images that have been captured since image data for a previous image was sent to the coarse classifier 123. While waiting, the camera application 114 may receive another image. The camera application 114 can determine a quality score (e.g., a measure of rotational motion) for the newly received image. The camera application 114 can compare the quality score for the stored best image to the quality score for the newly received image. If the quality score for the newly received image is greater than the quality score for the stored best image, the camera application 114 can replace the stored image data for the highest quality image with the image data for the newly received image. In this way, the camera application 114 is storing the image data for the highest quality image received while waiting until time for the subsequent analysis to be performed. By only storing the image data for the highest quality image, the amount of memory used to store image data is reduced relative to storing image data for multiple images.

The camera application 114 can use buffers to store the image data. For example, the camera application 114 can store image data for a newly received image in an image buffer. The camera application 114 can also store image data for the highest quality image in a selected image buffer. If a newly received image has a higher quality score than the image for which image data is stored in the selected image buffer, the camera application 114 can replace the image data in the selected image buffer with the image data for the newly received image. In another example, if a newly received image has a higher quality score than the image for which image data is stored in the selected image buffer, the camera application 114 can update the selected frame pointer to point to the image buffer. The camera application 114 can provide the image data stored in the selected image buffer to the coarse classifier 123, e.g., after a predetermined time interval or when the coarse classifier 123 is ready to process another image.

In some implementations, the camera application 114 selects, from multiple images, an image for further analysis based on data indicative of the movement of the camera 112 (e.g., rotational motion) at the time each image was captured in combination with a time at which each image was captured. For example, a more recently received image having a slightly lower quality score (e.g., within a threshold amount) than the quality score for an older image may be preferred and therefore selected.

A three-tier strategy may be used to select an image from multiple images. In this example, if the image has a quality score that is less than a first threshold, the image may not be used at all as the quality of the image not be sufficient to detect or recognize objects depicted in the image. By not sending such low quality images to the subsequent stages, computing power and electrical power that would otherwise be used is avoided. If one or more images have a quality score that is greater than a second threshold (which is higher than the first threshold), the camera application 114 can select the most recent image that has a quality score that is greater than the second threshold. If no image of the multiple images has a quality score that is greater than the second threshold, but one or more images have a quality score that is between the two thresholds, the camera application 114 can select one of the one or more images that has the highest quality score.

In some implementations, the camera application 114 can select an image for further analysis based on data indicative of the movement of the camera 114 at the time at which the image was captured and visual characteristics of the image. Using data indicative of the movement of the camera 114 can reduce the number of visual characteristics and/or the types of visual characteristics needed to determine the quality of an image relative to using visual characteristics alone.

In some implementations, the camera application 114 can select an image for further analysis based on light features of the images. The light features are those that are computed based on visual input, but in a less computationally intensive manner than examining the image using vision analysis. For example, the quality score for an image may be based on a combination of the data indicative of the movement of the camera 114 and light features of the image. The light features may be specified in metadata for the image. The light features can include brightness information, focus information, histograms that indicate characteristics including high level contrast within the image, and/or movement of objects within the image (e.g., based on the location of an object within a previous image and the location of the same object in this current image). Similar to light data, other features of the image that are already specified in metadata can be used as this data does not require further image analysis.

In some implementations, the image selection process is performed in hardware, e.g., a hardware circuit or controller separate from the processor of the mobile device 110. In this way, the mobile device's processor does not have to process any data or execute any instructions for the image selection process, resulting in even less demand being placed on the processor. For example, the hardware circuit may receive movement data from the IMU, gyroscope, or other sensor and use the data to determine whether the image has sufficient quality (e.g., less than a threshold amount of movement or rotational jitter) to be sent to the coarse classifier 123. If an image is detected by the hardware circuit as having sufficient quality, the hardware circuit can wake the processor and cause the processor to perform coarse classification on the image.

The coarse classifier 123, which can include multiple coarse classifiers, detects the presence of one or more classes of objects depicted in an image. The coarse classifier 123 can detect the presence of a class of objects based on whether or not the image includes one or more features that are indicative of the class of objects. The coarse classifier 123 can include a light-weight model to perform a low computational analysis to detect the presence of objects within its class(es) of objects. For example, the coarse classifier 123 can detect, for each class of objects, a limited set of visual features depicted in the image to determine whether the image depicts an object that falls within the class of objects. In a particular example, the coarse classifier 123 can detect whether an image depicts an object that is classified in one or more of the following classes: text, barcode, landmark, media object (e.g., album cover, movie poster, etc.), or artwork object (e.g., painting, sculpture, etc.). For barcodes, the coarse classifier 123 can determine whether the image includes parallel lines with different widths.

In some implementations, the coarse classifier 123 uses a trained machine learning model (e.g., a convolutional neural network) to classify images based on visual features of the images. For example, the machine learning model can be trained using labeled images that are labeled with their respective class(es). The machine learning model can be trained to classify images into zero or more of a particular set of classes of objects. The machine learning model can receive, as inputs, data related to the visual features of an image and output a classification into zero or more of the classes of objects in the particular set of classes of objects.

The coarse classifier 123 can output data specifying whether a class of object has been detected in the image. The coarse classifier 123 can also output a confidence value that indicates the confidence that the presence of a class of object has been detected in the image and/or a confidence value that indicates the confidence that an actual object, e.g., the Eiffel Tower, is depicted in the image.

In some implementations, the camera application 114 includes multiple coarse classifiers. In this example, each coarse classifier can detect the presence of a particular class of objects and output a confidence score for the particular class. Each of the multiple coarse classifiers can detect the presence of a different class of objects than each other coarse classifier.

In some implementations, the coarse classifier 123 is a composite coarse classifier 123 that can determine the confidence score of multiple coarse classifiers, e.g., simultaneously. For example, a composite coarse classifier can determine, for an image, the confidence score for multiple different classes of objects simultaneously. The composite coarse classifier can include a core portion that's common to each classification and several modules that each determine a per-class probability for the classes of objects. This can reduce the overall computation performed by the camera application 114 to detect the presence of one or more classes of objects depicted in the image, for example, by reducing redundant computations.

The coarse classifier 123 can also output annotations that specify data about the objects detected in the image and provide the data to one or more vision analyzers 134. For example, if the coarse classifier 123 detects the presence of text in the image, the coarse classifier 123 can provide annotations that specify where the text is located and the orientation of the text. The coarse classifier 123 can also provide annotations that specify types of text detected, e.g., phone numbers, addresses, etc. Such data can save on computational costs and time of performing OCR to recognize the actual text later by a text analyzer 126. Similarly, if the coarse classifier 123 detects a barcode in the image, the coarse classifier 123 can provide annotations that specify the location and type of the barcode to save on computational costs and time of reading/decoding the barcode by a barcode analyzer 128.

As described above, an image can be selected for coarse classification at an appropriate time, such as when coarse classification has been completed for a previous image. In some implementations, the camera application 114 may perform coarse classification on an image periodically based on a processing rate. For example, the camera application 114 can select an image (or retrieve a stored best image from a selected frame buffer) every second (or some other time period) and perform coarse classification on the image.

In some implementations, the camera application 114 can dynamically and automatically adjust the processing rate based on whether the presence of one or more classes of objects has been detected by the coarse classifier 123 in one or more previously analyzed images. For example, if the camera 112 is not capturing images of objects that are classified within one of the classes of objects for which the coarse classifier 123 is configured to detect, the camera application 114 may reduce the rate at which images are being analyzed by the coarse classifier 123. In this example, if the presence of a class of objects was not detected in a previous image (or a threshold number of previous images), the camera application 114 may reduce the processing rate to increase the period of time between each coarse classification. This can reduce the amount of computing power and electrical power consumed in performing the coarse classification when images that do not depict relevant objects are being captured. For example, this processing rate adjustment can result in fewer CPU cycles used to classify images.

Similarly, the camera application 114 can increase the processing rate to reduce the period of time between each coarse classification if the presence of at least one class of objects has been detected in a previous image (or at least a threshold number of previous images). In this way, when the user is using the camera 112 to capture images of relevant objects, the camera application 114 can identify and present useful and relevant content to the user. This increased processing rate may be temporary. For example, the increase in processing rate may be reduced to a normal processing rate (or a reduced processing rate) after a specified period of time or in response to not detecting the presence of a class of objects in an image or at least a threshold number of images.

The camera application 114 can adjust the processing rate for coarse classification based on the amount of time since the user has opened the camera application 114 or selected a mode of the camera application in which image analysis and content presentation are performed. For example, a user may be more active with capturing images and viewing content related to objects depicted in the image immediately after opening the camera application 114 or entering into the analysis and content presentation mode. In this example, the camera application 114 may use a faster processing rate when the camera application 114 is opened or the analysis and content presentation mode is entered, then use a slower processing rate after a specified amount of time has lapsed or after the coarse classifier 123 has evaluated at least a threshold number of images without detecting an object in at least one of the classes of objects.

The camera application 114 can adjust the processing rate for coarse classification based on user interactions with the camera application 114. For example, if the user has interacted with a result or other content provided based on an analyzed image, the camera application 114 may increase the processing rate for coarse classification or maintain the initial fast processing rate. The camera application 114 can adjust the processing rate based on a frequency of user interactions in a current session and/or a frequency of user interactions in multiple user sessions including historical user sessions of the user with the camera application 114. A user session may be defined by the opening and closing of the camera application 114 and/or the beginning and ending of the image analysis and content presentation mode.

In some implementations, the camera application 114 or the mobile device 110 itself includes a power management system that determines and adjusts the processing rate for coarse classification based on whether previous images have been detected as depicting an object of one or more classes. When an image is not being classified by the coarse classifiers, the processor of the mobile device 110 (or a controller used to analyze images) can sleep (e.g., go into a sleep mode and not execute instructions) to consume less power.

If the coarse classifier 123 detects the presence of a class of objects in an image, the coarse classifier 123 can provide the image data for the image to an appropriate object recognizer 134. The object recognizers 134 can include a text recognizer 126 that recognizes text (e.g., recognizes characters, words, etc.) in images, a barcode recognizer 128 that recognizes (e.g., decode) barcodes (e.g., including QR codes) in images, and a landmarks recognizer 130 that recognizes landmarks (e.g., identifies actual landmarks) in images. The camera application 114 can include analyzers for other types of objects in addition to, or in place of, the analyzers 126, 128, and 130. For example, the camera application 114 may include a media cover (e.g., album cover) analyzer, an artwork analyzer, and/or other appropriate analyzers. In some implementations, the camera application 114 includes a single object recognizer that recognizes multiple different classes of objects, e.g., text, barcodes, landmarks, media covers, artwork, etc.

If the coarse classifier 123 detects the presence of text in an image, the coarse classifier 123 can provide the image data for the image to the text recognizer 126. If the coarse classifier 123 detects the presence of a barcode in an image, the coarse classifier 123 can provide the image data for the image to the barcode recognizer 128. If the coarse classifier 123 detects the presence of a landmark in an image, the coarse classifier 123 can provide the image data for the image to the landmark recognizer 128.

In some implementations, the coarse classifier 123 provides the image data for the image to each object recognizer 134 for each class of object for which the image has a confidence value that satisfies (e.g., meets or exceeds) a threshold. For example, the coarse classifier 123 can determine a confidence value that the image depicts text and, if the confidence value satisfies the threshold, the coarse classifier 123 can provide the image to the text recognizer 126.

Each object recognizer 134 can perform more detailed image analysis than the coarse classifier 123 to recognize objects depicted in images received from the coarse classifier 123. For example, the object recognizer 134 can use edge detection, pattern recognition, and other computer vision techniques to recognize objects depicted in the images and extract information from the images.

The text recognizer 126 can recognize text depicted in images using optical character recognition (OCR). The barcode recognizer 128 can read/decode barcodes depicted in images and obtain information about an object (e.g., product) represented by the barcode. The landmarks recognizer 130 can use image data of landmarks and pattern recognition to recognize landmarks depicted in images. In some implementations, the camera application 114 stores an object index 115 that includes image data and barcode data for particular objects for use in recognizing objects and reading barcodes depicted in images. The image data for an object can include data specifying visual features of the objects that can be used in computer vision analysis to recognize images of the objects.

The camera application 114 can perform inter-frame processing for at least some classes of objects. For example, the camera application 114 can perform inter-frame processing 127 on images in which the text recognizer 126 has recognized text and the camera application 114 can perform inter-frame processing 131 on images in which the landmark recognizer 130 has recognized a landmark. In general, inter-frame processing leverages data regarding objects recognize in previous images in detecting objects in a current image.

The inter-frame processing 127 for text can establish correlation between a same line (or same portion) of text in two images to determine whether the same text is being detected. The camera application 114 can then keep the best version of the text, e.g., the text for which the text recognizer 126 has determined to be of a higher quality, which can improve the accuracy of text recognition. To determine whether two portions of text are the same, the camera application 114 can use the inter-frame processing 127 to evaluate a distance between the two portions of text in the two (or more) images and an edit distance between text in the two images. The camera application 114 can use inter-frame processing 127 to determine the distance directly based on the location of the portions of text in two images, by tracking the text using optical tracking, and/or predict where the text will be based on movement of the mobile device 110 between the capture of the two images. The edit distance may indicate a number or percentage of characters that is different between the portions of text in the two images. If the distance and the edit distance are both less than a threshold, the two or more images can be correlated and the image having the highest confidence value and/or the highest quality score can be retained for later use.

In some implementations, the portions of text may be retained from multiple images. For example, the camera application 114 can use inter-frame processing 127 to correlate text on a line-by-line basis, a character-by-character basis, or a word-by-word basis. The camera application 114 can identify which of the correlated lines of text has the highest confidence and/or highest quality and retain that the portion of the image having the highest confidence and/or highest quality line of text for the text analyzer 126. Similarly, the camera application 114 can determine which of the correlated words (or characters) has the highest confidence and/or highest quality and retain that the portion of the image having the highest confidence and/or highest quality word (or character). Thus, when multiple images have the same text, e.g., due to the camera pointing at the same document or other text source for a period of time, the text recognize in multiple image portions may be provided to the result identifier 132 to provide the highest quality version of each portion of the text.

The inter-frame processing 131 for landmarks (and other types of objects) can evaluate a confidence value (determined by the landmark recognizer 130) that indicates the confidence that a particular landmark (or other object) has been detected in multiple images in determining whether an image depicts the particular landmark (or object). In some implementations, the inter-frame processing 131 uses multiple thresholds for determining how many images in a sequence have to be identified as depicting a particular landmark before classifying an image as depicting the landmark for the result identifier 132. For example, if the confidence values that indicate that the images depict a landmark are greater than a first threshold, the camera application 114 can determine that a first number of images must be classified as depicting the particular landmark before classifying the images as depicting the particular landmark. If the confidence values are less than the first threshold but greater than a second threshold, the camera application 114 may require a second number of images to have been classified as depicting the particular landmark in order to determine that the images depict the particular landmark, where the second number is higher than the first number.

The result identifier 132 can identify content for presentation at the mobile device 110 (e.g., within the camera application 114). For example, if an image includes a barcode, the result identifier 132 can identify the object represented by the barcode and present content (e.g., images, title, etc.) related to the object. If the image includes a landmark, the result identifier 132 can identify and present, in a user interface 116, content related to the landmark, e.g., photos of the landmark, a map to the landmark etc.

The result identifier 132 can identify content for a recognized object in a content data store 116. The content data store 116 can include content for each of a set of objects. The content in the content data store 116 can be loaded onto the mobile device 110, e.g., by the camera application 114. The content can include text, images, videos, and/or other appropriate content that can be presented by a mobile device 110.

The identified content for an object can be presented in the user interface 116 with the image. For example, the content may be presented in a viewfinder in which the image is depicted within the camera application 114. In this example, the content may be presented in an overlay over the real-time view of the camera in which the object, text, or barcode was detected.

If the coarse classifier 123 detects more than one class of objects depicted in an image, the result identifier 132 can identify results for each class and present at least one result for each class. For example, the camera application 114 can present a results page that includes a result that corresponds to each class of object detected in the image.

In some implementations, the camera application 114 can present icons with which a user can request content related to a detected object. For example, if the image includes a phone number, the camera application 114 may present an icon that, if interacted with (e.g., selected) by the user, causes the mobile device 110 to initiate a call to the phone number. If a barcode is detected, the camera application 114 can present icons to launch a shopping application to purchase the product represented by the barcode, an icon to initiate a search for the product using a search application or a web browser, and/or an icon to share the product, e.g., using a social networking application. If a landmark is detected, the camera application 114 can present an icon to launch a map application to present a map to the landmark, an icon to initiate a search for the landmark, and/or an icon to view images of the landmark. The icons can be presented with the image, e.g., within the viewfinder of the camera application 114.

In some implementations, the camera application 114 can highlight, in the user interface 116 of the camera application 114, an object being detected so that a user can see what object is being detected. For example, while the user is pointing the camera 112 at an object, the coarse classifier 123 can detect the presence of a class of objects and the image can be sent to one or more of the object recognizers 134 for analysis. While the image is being analyzed by the one or more object recognizers 134, the camera application 114 can highlight the object being recognized.

In some implementations, the camera application 114 customizes the object index 115 and or the content in the content data store 116 for a user. For example, if the camera application 114 receives data indicating that the user is going to travel to a particular location, the camera application 114 can update the object index 115 to include image data and/or barcode data for objects, landmarks, etc. located at the particular location. The camera application 114 can also update the content data store 116 to include content related to the objects, landmarks, etc. located at the particular location.

In some implementations, some elements of the image analysis and result identification are located at a visual analysis server 150. For example, the visual analysis server 150 may include a visual analyzer 152 that recognizes objects depicted in images received from the camera application 114 over a data communication network 140, e.g., a local area network ("LAN") and a wide area network ("WAN"), e.g., the Internet. The visual analysis server 150 can also include a result processor 154 that identifies results or other content related to objects recognized by the vision analyzer 152 and provides the results or content to the mobile device 110. In this example, the image selector 122 and the coarse classifier 123 can be implemented on the mobile device 110, e.g., as part of the camera application 114.

The camera application 114 can provide portions of an image for which the coarse classifier 123 detected the presence of a class of objects or feature data for the image to the visual analysis server 154. For example, if a coarse classifier 123 detects the presence of a landmark in an image, the camera application 114 can provide the portion of the image that includes the landmark to the visual analysis server 150, without providing the entire image.

Similar to the camera application implementation, if an image is not selected by the image selector 122 (e.g., for having a quality score that does not meet a threshold), the camera application 114 can determine to not send the image (or a portion of the image) to the visual analysis server 150. Similarly, if the coarse classifier 123 does not detect the presence of a class of object in the image, the camera application 114 may determine to not send the image (or a portion of the image) to the visual analysis server 150.

Although, the stages of image selection and image analysis are illustrated as being performed in order, some stages can be performed in parallel. For example, multiple images can be classified by coarse classifier(s) at the same time. Similarly, an image can be analyzed by multiple coarse classifiers in parallel.

In some implementations, the image selector 122 is implemented as a controller or as part of a controller of the mobile device 110. In this example, the coarse classifier 123 and/or the object recognizers 134 can be implemented on an image processing apparatus, e.g., of the mobile device 110 or the visual analysis server 150.

Figure 2:
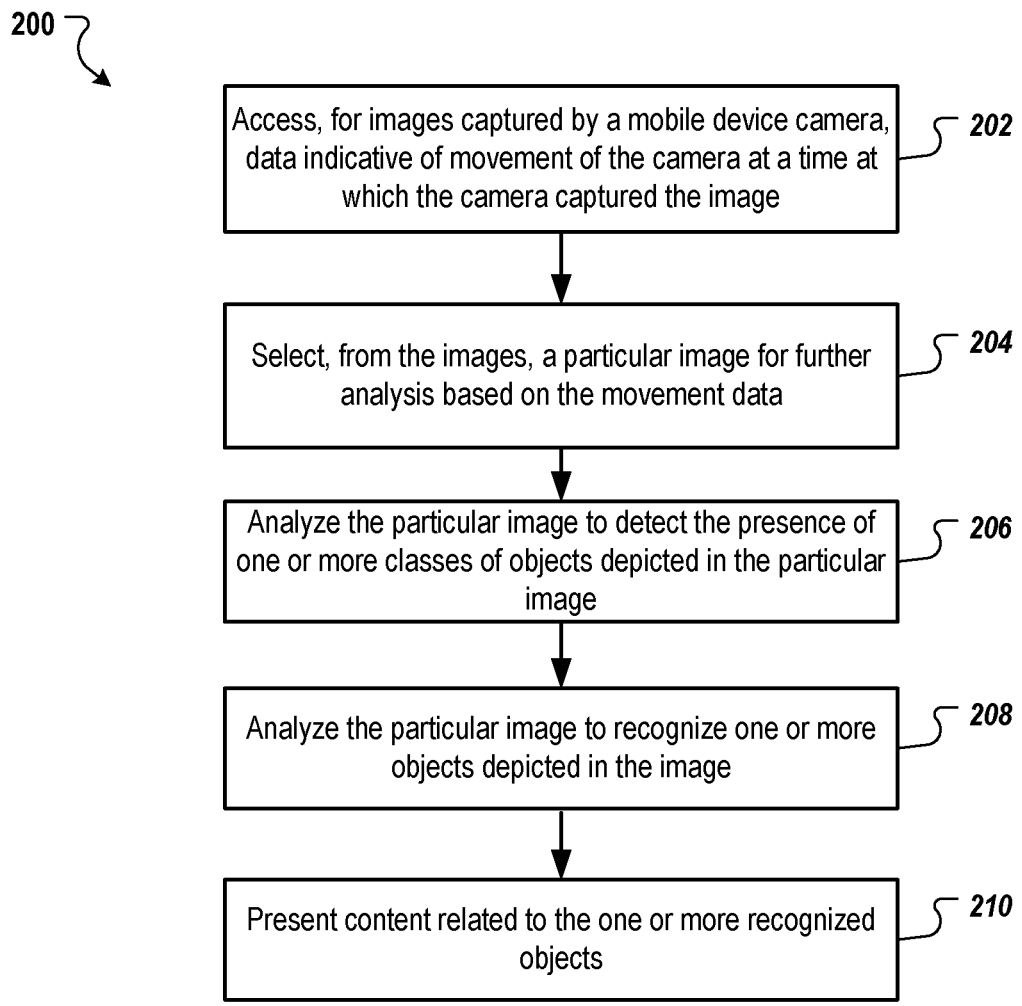
FIG. 2 is a flow diagram that illustrates an example process for analyzing an image and presenting content related to one or more objects depicted in the image.

FIG. 2 is a flow diagram that illustrates an example process 200 for analyzing an image and providing content related to one or more objects depicted in the image. Operations of the process 200 can be implemented, for example, by a system that includes one or more data processing apparatus, such as mobile device 110 of FIG. 1. The process 200 can also be implemented by instructions stored on a computer storage medium, where execution of the instructions by a system that includes a data processing apparatus cause the data processing apparatus to perform the operations of the process 200.

The system accesses, for images captured by a mobile device camera, data indicative of movement of the camera at a time at which the camera captured the image (202). For example, the system can receive a stream of images (e.g., a video stream). The system can also obtain data indicative of the movement of the device on which the camera is installed for each image. For example, the movement data for each image can be received from one or more environment sensors such as a gyroscope, an accelerometer, or an IMU. For each image, the movement data can indicate the movement of the device at the time the image was captured. For example, the system can request the movement data from the sensor at the time that the camera is capturing the image.

In another example, the system can provide, to the environment sensor, a time window that includes the time at which the image was captured. In response, the environment sensor can provide movement data detected by the environment sensor during the time window. The system can then determine how the camera was moving at the time the image was captured based on the data.

The system selects, from the images, a particular image for analysis based on the movement data for the images (204). The system can select the image for which the movement of the device was the least or for which the rotational motion was the least. As described above, the image can also be selected based on a time at which the image was capture relative to the time at which other images were captured and/or based on light features of the images. The selection can be made independent of visual characteristics of the image, or in combination with visual characteristics of the image.

The system analyzes the particular image using one or more coarse classifiers to detect the presence of one or more classes of objects depicted in the particular image (206). Each coarse classifier can be configured to detect presence of a respective class of object, e.g., text, landmark, artwork, media cover, barcode, etc. Each coarse classifier can output data specifying whether the particular image depicts its class of object and a confidence value indicating the confidence that the coarse classifier has in its determination. Each coarse classifier can also output annotations that include data describing characteristics of the detected object, such as location, orientation, etc.

In response to detecting presence of at least one class of object in the image, the system analyzes the image to recognize one or more objects depicted in the image (208). For example, the system may use one or more computer vision techniques to recognize objects depicted in the image. The techniques used can be based on the class(es) of objects detected in the image by the coarse classifier. For example, if the image is classified as having a barcode, the system can use a barcode recognizer to read the barcode and identify the product referenced by the barcode.

The system presents content related to the one or more identified objects (212). For example, the system can present the content in one or more overlays over the image or on a results page. The system can present icons that, when interacted with by a user, cause the system to present content related to the objects recognized in the image. For example, the icons can include an icon to initiate a search for a recognized object, display a map to a recognized landmark, present other images of a recognized object, etc.

Figure 3:
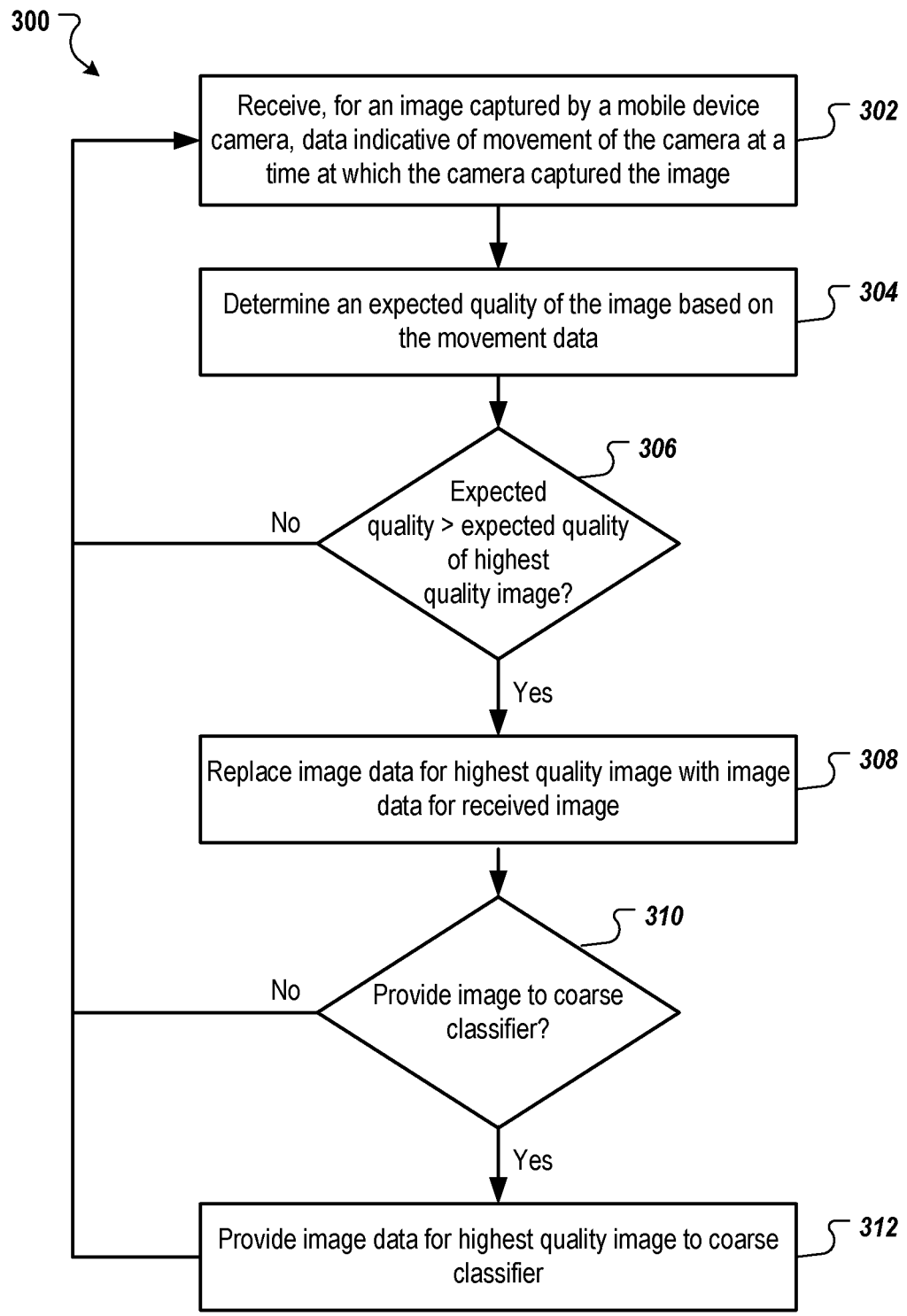
FIG. 3 is a flow diagram that illustrates an example process for selecting an image for analysis.

FIG. 3 is a flow diagram that illustrates an example process 300 for selecting an image for analysis. Operations of the process 300 can be implemented, for example, by a system that includes one or more data processing apparatus, such as mobile device 110 of FIG. 1. The process 300 can also be implemented by instructions stored on a computer storage medium, where execution of the instructions by a system that includes a data processing apparatus cause the data processing apparatus to perform the operations of the process 300.

The system receives movement data for an image captured by a mobile device camera (302). As described above, the movement data can be indicative of the movement of the mobile device camera at the time at which the image was captured by the mobile device camera. The mobile device camera can capture images in a sequence, e.g., as a video stream. In some implementations, the mobile device camera captures images at a rate in the range of 20-70 frames per second.

The system determines an expected quality of the image based on the movement data (304). For example, the expected quality of the image can be based on an amount of movement of the mobile device camera at the time at which the image was captured. In this example, more movement can result in a lower quality score as the movement may reduce the quality of the image due to blurring.

The system determines whether the expected quality of the image is greater than the expected quality of a highest quality image for which image data is being stored (306). For example, the system can store image data for a single image only and this single image may be the highest quality image (based on expected quality) of images captured since a previous image was sent to a coarse classifier. Each time a new image is received, the system can determine whether the newly received image has a higher expected quality than the highest quality image for which image data is currently being stored.

If the newly received image does not have a higher expected quality than the previously identified highest quality image, the system continues storing the previously stored image data for the highest quality image and waits for another image to be received. If the newly received image has a higher expected quality than the highest quality image, the system replaces the image data for the highest quality image with image data for the newly received image (308).

In some implementations, the system sets a replacement threshold for the expected image quality based on the image data stored for the highest quality image. In this example, the system replaces the image data for the highest quality image with the image data for the newly received data if the expected image quality of the newly received image exceeds the replacement threshold. The system can reduce the replacement threshold over time.

The system determines whether to provide the image data for the highest quality image to a coarse classifier (310). In some implementations, the system provides the image data to the coarse classifier based on a predetermined time period. In some implementations, the system provides the image data to the coarse classifier in response to receiving a request from the coarse classifier.

If the system determines to not provide the image data to the coarse classifier, the system continues receiving images and determining whether to replace the image data for the highest quality image until determining to provide the image data to the coarse classifier. In this way, the system only stores image data for the highest quality image.

If the system determines to provide the image data to the coarse classifier, the system provides the image data to the coarse classifier for classification (312).

Figure 4:
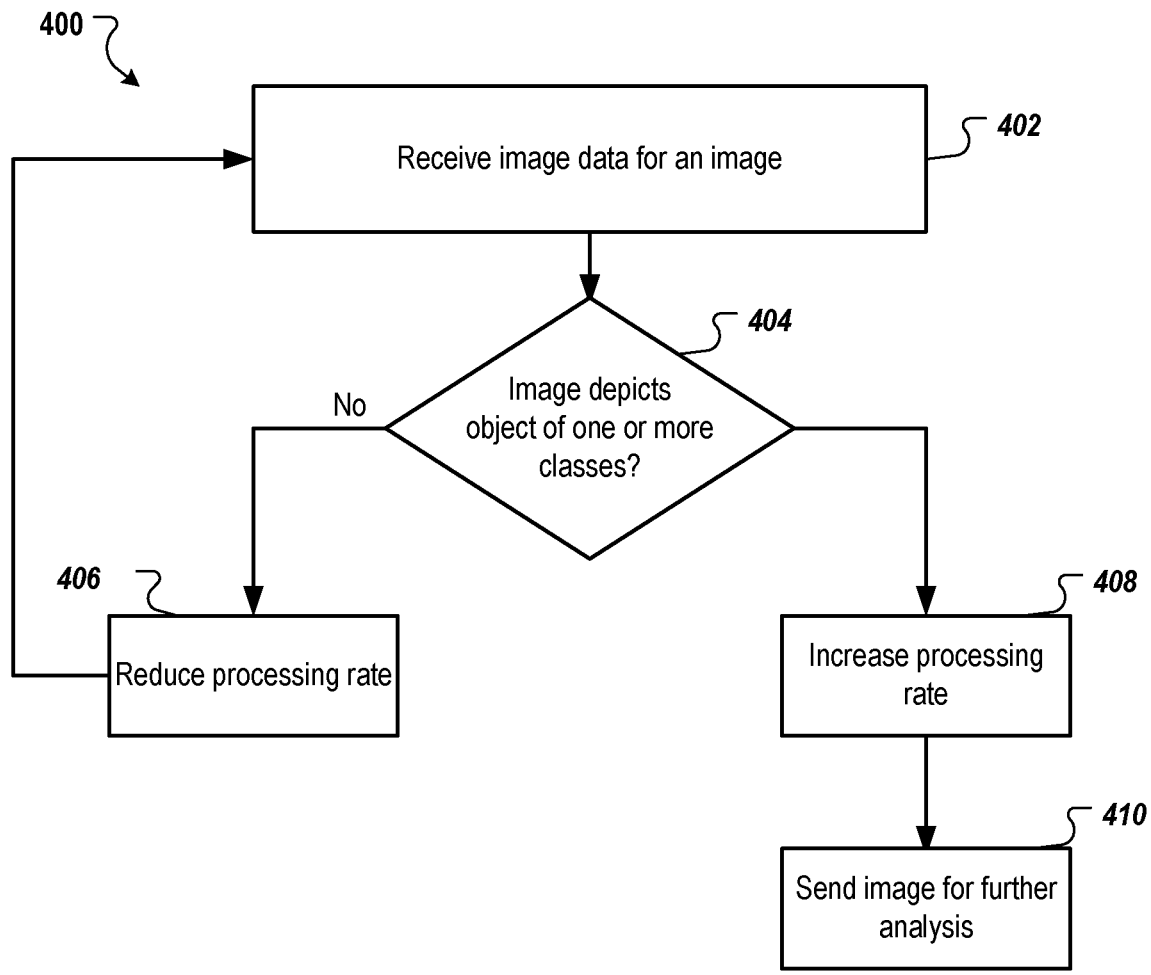
FIG. 4 is a flow diagram that illustrates an example process for adjusting a processing rate for analyzing images.

FIG. 4 is a flow diagram that illustrates an example process 400 for adjusting a processing rate for analyzing images. Operations of the process 400 can be implemented, for example, by a system that includes one or more data processing apparatus, such as mobile device 110 of FIG. 1. The process 400 can also be implemented by instructions stored on a computer storage medium, where execution of the instructions by a system that includes a data processing apparatus cause the data processing apparatus to perform the operations of the process 400.

The system receives image data for an image (402). The image data can include image pixel data for the image, including color values for each pixel of the image.

The system determines whether the image contains an object classified in one or more classes (404). For example, the system can use a coarse classifier to determine whether the image contains an object classified in the one or more classes, as described above.

If the system determines that the image does not contain an object classified in the one or more classes, the system reduces a processing rate for analyzing the images to determine whether the images contain an object of the one or more classes (406). For example, the system can use a coarse classifier to analyze the images periodically based on the processing rate. If the system determines that one or more images do not contain an object in one of the classes, the system can decrease the processing rate to reduce the frequency at which the images are analyzed. This allows the system to reduce computer resource usage and power consumption when images that do not contain an object of interest are being captured. The system can wait until a predetermined number of images (e.g., five, ten, or another appropriate number) do not contain an object on one of the classes before reducing the processing rate.

If the system determines that the image does contain an object classified in at least one of the classes, the system increases the processing rate (408). For example, the system can increase the processing rate to an active processing rate that the system uses when the images contain objects of interest. If the processing rate was already at the active processing rate, the system can leave the processing rate unchanged.

The system sends the image that contain an object of at least one of the classes for further analysis (410). For example, the system can send the image to an object recognizer that recognizes objects of the at least one class.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:
1. A system, comprising:
a camera configured to capture images;
one or more environment sensors configured to detect movement of the camera;
a data processing apparatus; and
a memory storage apparatus in data communication with the data processing apparatus, the memory storage apparatus storing instructions executable by the data processing apparatus and that upon such execution cause the data processing apparatus to perform operations comprising:
  accessing, for each of a plurality of images captured by a mobile device camera, data indicative of movement of the camera at a time at which the camera captured the image;
  selecting, from the plurality of images, a particular image for analysis based on the data indicative of the movement of the camera for each image;
  analyzing, using a coarse classifier, the particular image to determine whether the particular image depicts at least one object of one or more particular classes of objects;
  whenever the particular image depicts an object of the one or more particular classes of objects:

analyzing the particular image using an object recognition process to recognize one or more objects depicted in the particular image; and presenting content related to the one or more recognized objects; and whenever the particular image does not depict an object of the one or more particular classes of objects, determining to not analyze the particular image using the object recognition process.

2. The system of claim 1, wherein analyzing the image to recognize one or more objects depicted by the image comprises analyzing the image using one or more computer vision techniques.

3. The system of claim 1, wherein the data indicative of the movement of the mobile device comprises at least one of (i) inertial acceleration measurements received from an accelerometer sensor of the mobile device or (ii) orientation data received from a gyroscope of the mobile device.

4. The system of claim 1, wherein selecting, from a plurality of images, a particular image for analysis comprises selecting the particular image based on the particular image having a least amount of movement at the time the camera captured the particular image relative to each an amount of movement at the time the camera captures each other image in the plurality of images.

5. The system of claim 1, wherein the data indicative of the movement of the mobile device for each image comprises data describing rotational motion of the mobile device at the time at which the image was captured.

6. The system of claim 5, wherein selecting, from a plurality of images, a particular image for analysis comprises selecting the particular image based on the rotational motion of the mobile device at the time at which the particular image was captured being less than a threshold amount of rotational motion.

7. The system of claim 1, wherein the operations further comprise:

receiving a request for an image to be analyzed by the coarse classifier following completion of analysis of a previous image by the coarse classifier, wherein selecting, from a plurality of images, a particular image for analysis comprises selecting the particular image based on the particular image having a least amount of movement relative to other images in a set of images captured by the camera following the previous image being sent to the coarse classifier for analysis.

8. The system of claim 1, wherein analyzing the particular image using the coarse classifier comprises initiating analysis by the coarse classifier periodically based on a processing rate.

9. The system of claim 8, wherein the operations comprise adjusting the processing rate based on user interactions with the camera application.

10. The system of claim 8, wherein the operations comprise adjusting the processing rate based on whether presence of one or more classes of objects has been detected in one or more images analyzed by the coarse classifier over a previous time period.

11. The system of claim 10, wherein the processing rate is increased such that more images are analyzed by the coarse classifier per unit time in response to detecting presence of one or more classes of objects in at least one image over the previous time period.

12. The system of claim 10, wherein the processing rate is reduced such that fewer images are analyzed by the coarse classifier per unit time in response to not detecting presence of one or more classes of objects in at least one image over the previous time period.

13. The system of claim 1, wherein presenting content related to the one or more identified objects comprises presenting a results page that include results that include links to resources related to the one or more identified objects.

14. The system of claim 1, wherein presenting content related to the one or more identified objects comprises presenting, for each identified object, content related to the object in an overlay over the object.

15. The system of claim 1, wherein presenting content related to the one or more identified objects comprises presenting a selectable user interface element that, when selected by a user, initiates a particular action associated with the one or more identified objects.

16. The system of claim 1, wherein presenting content related to the one or more identified objects comprises:

selecting, for each class for which presence of an object of the class was detected by the coarse classifier, a content item related to the class; and presenting a content item for each class for which presence of an object of the class was detected by the coarse classifier.

17. The system of claim 1, wherein selecting, from the plurality of images, a particular image for analysis based on the data indicative of the movement the movement of the mobile device camera comprises selecting the particular image independent of data indicative of visual characteristics of the images.

18. The system of claim 1, wherein:

selecting, from the plurality of images, a particular image for analysis based on the data indicative of the movement of the mobile device camera comprises selecting the particular image based on the data indicative of the movement of the mobile device camera for each image in combination with data indicative of visual characteristics of each image; and the data indicative of the visual characteristics of each images comprises at least one of (i) brightness data, (ii) focus data, or (iii) histogram data.

19. The system of claim 1, wherein selecting, from the plurality of images, a particular image for analysis comprises:

determining, for each image, an expected image quality of the image based on the data indicative of the movement of the mobile device camera for the image; and selecting, as the particular image, an image having a highest expected image quality.

20. The system of claim 1, wherein selecting, from the plurality of images, a particular image for analysis comprises:

determining, for a first image of the plurality of images, a first expected image quality of the first image based on the data indicative of the movement of the mobile device camera for the first image;

storing image data for a first image in a selected frame buffer based on the first expected image quality of the first image;

determining, for a second image of the plurality of images, a second expected image quality of the second image based on the data indicative of the movement of the mobile device camera for the second image;

determining to replace, in the selected frame buffer, the image data for the first image with the image data for the second image based on the second expected image quality being greater than the first expected image quality.

21. The system of claim 1, wherein the operations comprise:
analyzing a second image using the coarse classifier to detect presence of one or more classes of objects depicted in the second image; and
determining to not use the object recognition process to analyze the second image to recognize one or more objects depicted in the second image in response to failure to detect the presence of the one or more classes of objects in the second image using the coarse classifier.

22. A method performed by data processing apparatus, comprising:
accessing, for each of a plurality of images captured by a mobile device camera, data indicative of movement of the camera at a time at which the camera captured the image;
selecting, from the plurality of images, a particular image for analysis based on the data indicative of the movement of the camera for each image;
analyzing, using a coarse classifier, the particular image to determine whether the particular image depicts at least one object of one or more particular classes of objects;
whenever the particular image depicts an object of the one or more particular classes of objects:
analyzing the particular image using an object recognition process to recognize one or more objects depicted in the particular image; and
presenting content related to the one or more recognized objects; and
whenever the particular image does not depict an object of the one or more particular classes of objects, determining to not analyze the particular image using the object recognition process.

23. A non-transitory computer storage medium encoded with a computer program, the program comprising instructions that when executed by a data processing apparatus cause the data processing apparatus to perform operations comprising:
accessing, for each of a plurality of images captured by a mobile device camera, data indicative of movement of the camera at a time at which the camera captured the image;
selecting, from the plurality of images, a particular image for analysis based on the data indicative of the movement of the camera for each image;
analyzing, using a coarse classifier, the particular image to determine whether the particular image depicts at least one object of one or more particular classes of objects;
whenever the particular image depicts an object of the one or more particular classes of objects:
analyzing the particular image using an object recognition process to recognize one or more objects depicted in the particular image; and
presenting content related to the one or more recognized objects; and
whenever the particular image does not depict an object of the one or more particular classes of objects, determining to not analyze the particular image using the object recognition process.

* * * * *